(12) United States Patent  
Inou et al.

(10) Patent No.: US 9,505,407 B2  
(45) Date of Patent: Nov. 29, 2016

(54) DRIVING SUPPORT APPARATUS (71) Applicant: DENSO CORPORATION, Kariya, Aichi-pref. (JP)

(72) Inventors: Hiroshi Inou, Anjo (JP); Hideaki Sakamoto, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 32 days.

(21) Appl. No.: 14/708,598

(22) Filed: May 11, 2015

(65) Prior Publication Data  
US 2015/0321669 A1 Nov. 12, 2015

(30) Foreign Application Priority Data

May 12, 2014 (JP) ................. 2014-098963

(51) Int. Cl.
| | |
|---|---|
| G06F 7/70 | (2006.01) |
| G06F 19/00 | (2011.01) |
| G06G 7/00 | (2006.01) |
| G06G 7/76 | (2006.01) |
| B60W 30/14 | (2006.01) |

(52) U.S. Cl.  
CPC .................. B60W 30/14 (2013.01)

(58) Field of Classification Search  
CPC ............ B60W 30/14; B60W 30/143; B60W 30/18145; B60W 30/045; B60W 40/072  
USPC ..................... 701/1, 41, 48, 70, 72  
See application file for complete search history.

(56) References Cited

U.S. PATENT DOCUMENTS

| 5,216,608 | A | * | 6/1993 | Ito ................. | B60K 28/16 |
| | | | | | 180/197 |
| 5,349,267 | A | | 9/1994 | Brassier et al. | |
| 5,357,798 | A | * | 10/1994 | Weinzerl ........... | B60T 8/17551 |
| | | | | | 701/1 |
| 8,258,934 | B2 | * | 9/2012 | Filev ................ | B60W 30/02 |
| | | | | | 180/170 |
| 2005/0027402 | A1 | * | 2/2005 | Koibuchi ........... | B60W 50/00 |
| | | | | | 701/1 |
| 2008/0294321 | A1 | | 11/2008 | Yamakado et al. | |
| 2010/0161192 | A1 | * | 6/2010 | Nara ................. | B60W 10/06 |
| | | | | | 701/70 |
| 2012/0173040 | A1 | * | 7/2012 | Yokota ............. | B60W 40/11 |
| | | | | | 701/1 |

(Continued)

FOREIGN PATENT DOCUMENTS

| JP | 05-270368 | 10/1993 |
| JP | 06-099772 | 4/1994 |

(Continued)

*Primary Examiner* — Jaime Figueroa  
(74) *Attorney, Agent, or Firm* — Harness, Dickey & Pierce, P.L.C.

(57) ABSTRACT

A driving support apparatus for a vehicle includes an actual longitudinal acceleration specifying section which specifies actual longitudinal acceleration of the vehicle, a target longitudinal acceleration specifying section which specifies target longitudinal acceleration of the vehicle, an acceleration and deceleration instruction section which allows acceleration and deceleration control so that the actual longitudinal acceleration specified by the actual longitudinal acceleration specifying section coincides with the target longitudinal acceleration specified by the target longitudinal acceleration specifying section. The target longitudinal acceleration specifying section specifies the target longitudinal acceleration so that traveling stability of the vehicle, which is represented by a Lissajous curve of a circle or an ellipse, is maintained, and a relationship between longitudinal acceleration and lateral acceleration, in which lateral acceleration of the vehicle is advanced or delayed in phase with respect to longitudinal acceleration, is satisfied.

5 Claims, 4 Drawing Sheets

(56) References Cited

U.S. PATENT DOCUMENTS

| | | | | |
|---|---|---|---|---|
| 2012/0326856 | A1* | 12/2012 | Levin | B60W 50/0097 340/441 |
| 2013/0151074 | A1* | 6/2013 | Takeuchi | B60W 10/06 701/37 |
| 2013/0191002 | A1* | 7/2013 | Minase | B60W 30/02 701/70 |
| 2014/0222296 | A1* | 8/2014 | Takeuchi | B60W 50/082 701/48 |
| 2014/0365171 | A1* | 12/2014 | Asano | B60W 40/13 702/174 |
| 2015/0239442 | A1* | 8/2015 | Yamakado | B60L 3/102 701/70 |
| 2015/0251664 | A1* | 9/2015 | Zagorski | B62D 6/003 701/41 |
| 2016/0059852 | A1* | 3/2016 | Yamakado | B60W 40/107 701/41 |

FOREIGN PATENT DOCUMENTS

| | | |
|---|---|---|
| JP | 2006-244284 | 9/2006 |
| JP | 2008-195226 | 8/2008 |
| JP | 2008-290469 | 12/2008 |

* cited by examiner

DRIVING SUPPORT APPARATUS

CROSS-REFERENCE TO RELATED APPLICATION

This application is based on and claims the benefit of priority from earlier Japanese Patent Application No. 2014-98963 filed May 12, 2014, the description of which is incorporated herein by reference.

BACKGROUND

Technical Field

The present invention relates to a driving support apparatus which automatically controls speed of a vehicle.

Related Art

A technique is known for automatically controlling speed of a vehicle on a curve in a road. In JP-A-2008-290469, a speed control apparatus is disclosed which controls speed of a vehicle by using a value, which is obtained by multiplying a rate of change of a curvature of the road by a proportional gain, as target longitudinal acceleration (target forward and backward acceleration). Thus, the speed control apparatus decreases the speed of the vehicle when the curvature of the road calculated from location information obtained from a GPS signal tends to increase, while increasing speed of the vehicle when the curvature of the road tends to decrease.

In the speed control apparatus disclosed in JP-A-2008-290469, a value is used, which is obtained by multiplying a rate of change of a curvature of a road by a proportional gain, as a target longitudinal acceleration. Thus, when the rate of change of the curvature of the road is constant, the target longitudinal acceleration also becomes constant. Some roads have different curvatures, though the rates of change of the curvatures are the same. According to the speed control apparatus disclosed in JP-A-2008-290469, the same target longitudinal acceleration is used for roads having different curvatures, if the rates of change of the curvatures are the same.

When the same target longitudinal acceleration is used for roads having different curvatures, the vehicle may not turn along the curvature of the curve in the road. This is due to different cornering forces acting on the roads having different curvatures. Even when the vehicle travels at a constant target longitudinal acceleration, higher lateral acceleration is applied or a side skid may be caused depending on the magnitude of the curvature. Thus, traveling stability of the vehicle cannot be assured. In addition, when the traveling stability of the vehicle cannot be maintained, the vehicle cannot smoothly travel on the curve in the road.

SUMMARY

An embodiment provides a driving support apparatus which can control speed of a vehicle so that the vehicle can smoothly turn along the curvature of a curve in a road.

As an aspect of the embodiment, a driving support apparatus is installed in a vehicle. The apparatus includes: an actual longitudinal acceleration specifying section which specifies actual longitudinal acceleration of the vehicle; a target longitudinal acceleration specifying section which specifies target longitudinal acceleration of the vehicle; and an acceleration and deceleration instruction section which allows acceleration and deceleration control so that the actual longitudinal acceleration specified by the actual longitudinal acceleration specifying section coincides with the target longitudinal acceleration specified by the target longitudinal acceleration specifying section. The target longitudinal acceleration specifying section specifies the target longitudinal acceleration so that traveling stability of the vehicle, which is represented by a Lissajous curve of a circle or an ellipse, is maintained, and a relationship between longitudinal acceleration and lateral acceleration, in which lateral acceleration of the vehicle is advanced or delayed in phase with respect to longitudinal acceleration, is satisfied.

DETAILED DESCRIPTION OF THE PREFERRED EMBODIMENTS

With reference to the accompanying drawings, hereinafter are described some embodiments of the present invention.

First Embodiment

Figure 1:
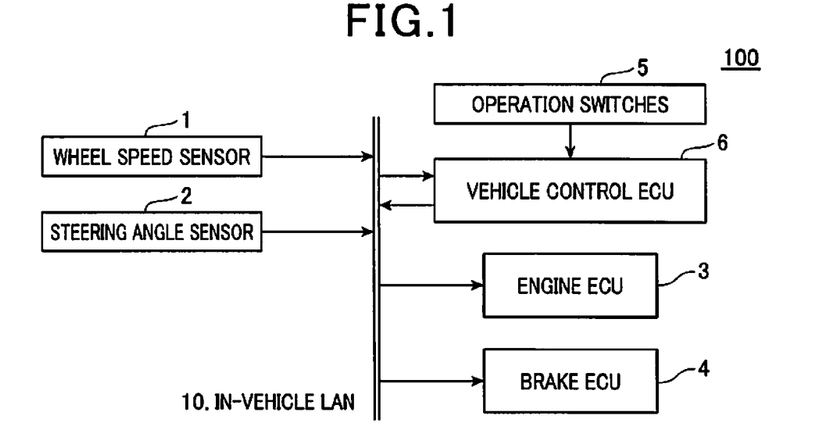
FIG. 1 is a block diagram showing an example of a schematic configuration of a driving support system.

FIG. 1 is a block diagram showing a schematic configuration of a driving support system 100. The driving support system 100 is installed in a vehicle, and includes a wheel speed sensor 1, a steering angle sensor 2, an engine ECU (electronic control unit) 3, a brake ECU 4, operation switches 5, and a vehicle control ECU 6. The wheel speed sensor 1, the steering angle sensor 2, the engine ECU 3, the brake ECU 4, and the vehicle control ECU 6 are connected to each other via, for example, an in-vehicle LAN (local area network) 10. Note that, hereinafter, the vehicle having the driving support system 100 is referred to as "own vehicle".

<Schematic Configuration of Driving Support System 100>

The wheel speed sensor 1 successively detects speed of the own vehicle (i.e. own vehicle speed) based on rotation speeds of driving wheels and transmits the detected own vehicle speed to the in-vehicle LAN 10. The steering angle sensor 2 successively detects a steering angle of the own vehicle and transmits the detected steering angle to the in-vehicle LAN 10

The engine ECU 3 controls a throttle actuator to accelerate the own vehicle. In addition, the engine ECU 3 controls the throttle actuator to generate engine braking, thereby decelerating the own vehicle. The brake ECU 4 controls a brake actuator to apply a braking force to the own vehicle, thereby decelerating the own vehicle.

The operation switches 5 are mechanical switches provided, for example, on the periphery of a steering. The operation switches 5 include a switch (hereinafter, referred to as "automatic speed control change switch") operated by a user to change a mode of automatically controlling the own vehicle speed, a switch (hereinafter, referred to as "turning behavior selection switch") operated by the user to select preferable behavior of the vehicle during turning in the mode of automatically controlling the own vehicle speed, and the like.

In the present embodiment, three patterns of behavior of the vehicle during turning include a quick pattern in which the vehicle turns after decelerating slightly, a slow pattern in which the vehicle turns after greatly decelerating, and a normal pattern in which the vehicle turns after normally decelerating. That is, the degree of deceleration in the normal pattern is between those in the quick pattern and the slow pattern.

The vehicle control ECU 6 is mainly configured by a microcomputer and includes a CPU, a ROM, a RAM, an I/O, and a bus connecting therebetween, which are known. The vehicle control ECU 6 performs various processes such as a speed control process related to control of speed of the own vehicle based on various kinds of information received from the wheel speed sensor 1, the steering angle sensor 2, and the operation switches 5. The vehicle control ECU 6 corresponds to a driving support apparatus.

Note that part or the whole of the functions of the vehicle control ECU 6 may be configured by hardware such as one or more ICs.

<Detailed Configuration of Vehicle Control ECU 6>

Figure 2:
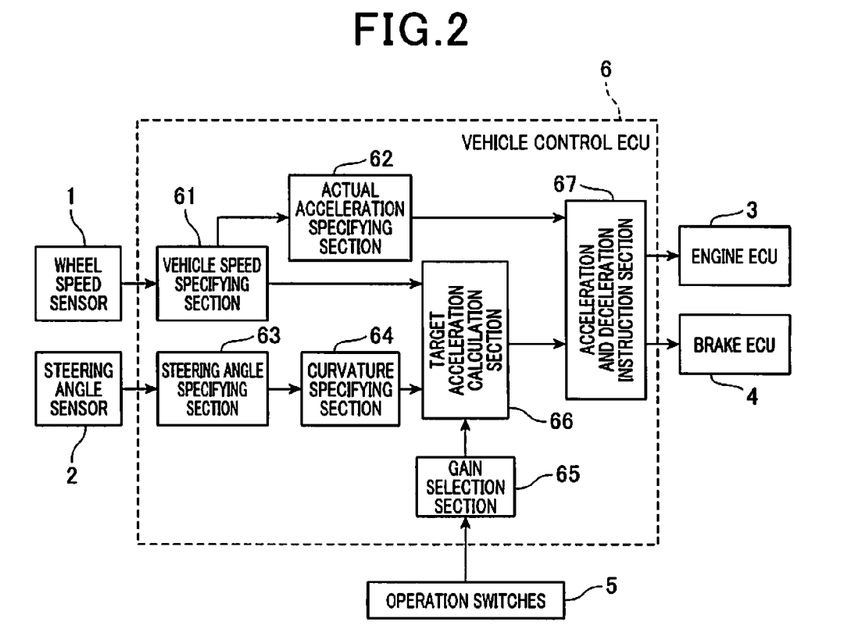
FIG. 2 is a block diagram showing an example of a schematic configuration of a vehicle control ECU.

As shown in FIG. 2, the vehicle control ECU 6 includes a vehicle speed specifying section 61, an actual acceleration specifying section 62, a steering angle specifying section 63, a curvature specifying section 64, a gain selection section 65, a target acceleration calculation section 66, and an acceleration and deceleration instruction section 67.

The vehicle speed specifying section 61 successively specifies own vehicle speed from a signal of the wheel speed sensor 1. The actual acceleration specifying section 62 specifies current longitudinal acceleration (forward and backward acceleration) of the own vehicle (hereinafter, referred to as "real acceleration") by differentiating the own vehicle specified by the vehicle speed specifying section 61 with respect to time. Values of the real acceleration include positive values, negative values, and zero. Positive values of the real acceleration indicate that the own vehicle is accelerating. Negative values of the real acceleration indicate that the own vehicle is decelerating. A real acceleration of zero indicates that the own vehicle is in uniform motion. The actual acceleration specifying section 62 corresponds to an actual longitudinal acceleration specifying section.

The steering angle specifying section 63 successively specifies a steering angle of the own vehicle from a signal of the steering angle sensor 2. The curvature specifying section 64 specifies a curvature of the road, on which the vehicle is traveling, from the steering angle of the own vehicle specified by the steering angle specifying section 63. The curvature of the road may be a curvature of a section obtained by dividing the road by shape points, or may be a curvature of a road boundary located in the vehicle width direction with respect to the position of the own vehicle (e.g. the center of the wheel axis of the front wheels). For example, a table or a map, which indicates a relationship between steering angles and various curvatures, may be previously stored in a memory of the vehicle control ECU 6. The steering angles are determined when the vehicle turns on roads having various curvatures. Thus, a curvature of the road may be specified from the steering angle with reference to the relationship.

The gain selection section 65 selects a value of a gain used for calculating target acceleration described later from three types of values respectively corresponding to the three patterns described above, depending on a pattern selected by the user by using the turning behavior selection switch of the operation switches 5. For example, if a signal indicating that the quick pattern is selected is inputted from the turning behavior selection switch, the gain selection section 65 selects a value of gain corresponding to the quick pattern.

Values of gains corresponding to the quick pattern, the slow pattern, and the normal pattern are previously stored in a nonvolatile memory of the vehicle control ECU 6, and are described later in detail. The gain selection section 65 corresponds to a selection section.

The target acceleration calculation section 66 calculates longitudinal acceleration which is a target of the own vehicle (hereinafter, referred to as "target acceleration") on a mode in which the own vehicle speed is automatically controlled. The target acceleration calculation section 66 corresponds to a target longitudinal acceleration specifying section.

The acceleration and deceleration instruction section 67 calculates longitudinal acceleration required for making an actual acceleration coincide with a target acceleration (hereinafter, referred to as "required acceleration"), based on the actual acceleration of the own vehicle specified by the actual acceleration specifying section 62 and the target acceleration of the own vehicle calculated by the target acceleration calculation section 66. Then, the acceleration and deceleration instruction section 67 instructs the engine ECU 3 and the brake ECU 4 to perform acceleration and deceleration corresponding to the calculated required acceleration.

For example, if the required acceleration is a positive value, the acceleration and deceleration instruction section 67 instructs the engine ECU 3 to perform acceleration corresponding to the required acceleration. If the required acceleration is a negative value, the acceleration and deceleration instruction section 67 instructs the engine ECU 3 and the brake ECU 4 to perform deceleration corresponding to the required acceleration.

<Calculation of Target Acceleration>

The calculation of target acceleration by the target acceleration calculation section 66 is explained. First, expressions for calculating the target acceleration are explained.

In the present embodiment, relationships between longitudinal acceleration and lateral acceleration, by which traveling stability of the vehicle is maintained, is represented by Lissajous curves of a circle or an ellipse based on a friction circle. Strictly speaking, the relationships between longitudinal acceleration and lateral acceleration, by which traveling stability of the vehicle is estimated to be maintained, are represented by Lissajous curves of a circle or an ellipse. Hereinafter, the Lissajous curve is referred to as "G Lissajous figure".

Note that the friction circle represents the limitation of grip (i.e. frictional force) of a tire by relationships between longitudinal force (forward and backward force) (i.e. driving force and braking force) and lateral force (i.e. cornering force) applied to the tire. In the present embodiment, the wording "traveling stability of a vehicle is maintained" means that the limitation of tire grip is not exceeded, that is, the own vehicle does not cause a side skid.

In addition, the G Lissajous figure does not necessarily represent the relationships between longitudinal acceleration and lateral acceleration, by which traveling stability of the vehicle is maintained, but can appropriately change the upper limit of the radius thereof within a range in which the traveling stability of the vehicle is maintained.

Figure 3:
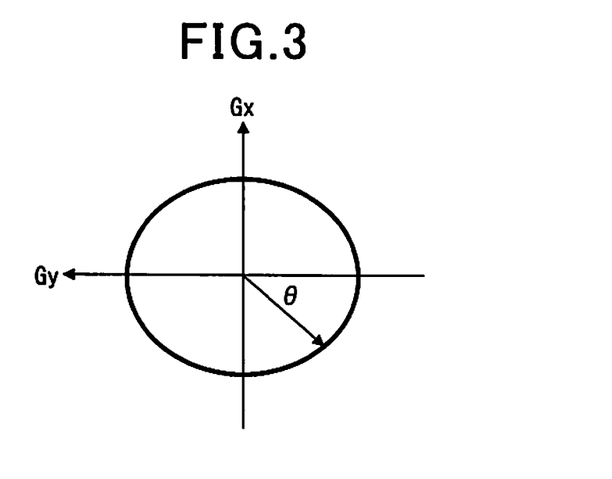
FIG. 3 is a schematic diagram showing an example of a G Lissajous figure.

As an example, the G Lissajous figure is expressed by an ellipse shown in FIG. 3. In FIG. 3, the vertical axis indicates longitudinal acceleration, and the horizontal axis indicates lateral acceleration. In addition, when θ is a phase angle, Gx is longitudinal acceleration, Gy is lateral acceleration, and Gmax is a value of a radius of the G Lissajous figure, Gx=Gmax X cosθ, and Gy=Gmax X sinθ. The phase of cosθ is advanced from that of sinθ by π/2. The relationship between Gx and Gy is a phase advance or phase delay, and can be expressed by the following expression 1 or expression 2.

$$Gx = \frac{d}{dt} Gy \quad \text{(Expression 1)}$$

$$\int Gx \, dt = Gy \quad \text{(Expression 2)}$$

When a gain K(P), whose numerical values can be changed, is determined, the G Lissajous figure can be changed to a circular shape or an arbitrary ellipsoidal shape while restriction conditions of phase advance or phase delay between Gx and Gy, that is, a relationship by which the traveling stability of the vehicle is estimated to be maintained is satisfied. In the present embodiment, the gain K(P) is used which is determined by an one-dimensional parameter p.

The relationship between Gx and Gy can be expressed by the following expression 3 or expression 4 when the gain K(P) is set. $K_1(p)$ indicates the gain K(p) used in the expression 3. $K_2(p)$ indicates the gain K(p) used in the expression 4. Note that since the expression 3 can be converted to the expression 4, and the expression 4 can be converted to the expression 3, the expressions 3 and 4 are substantially the same.

$$\dot{G}y = K_1(p) Gx \quad \text{(Expression 3)}$$

$$Gy = K_2(p) \int Gx \quad \text{(Expression 4)}$$

Figure 4:
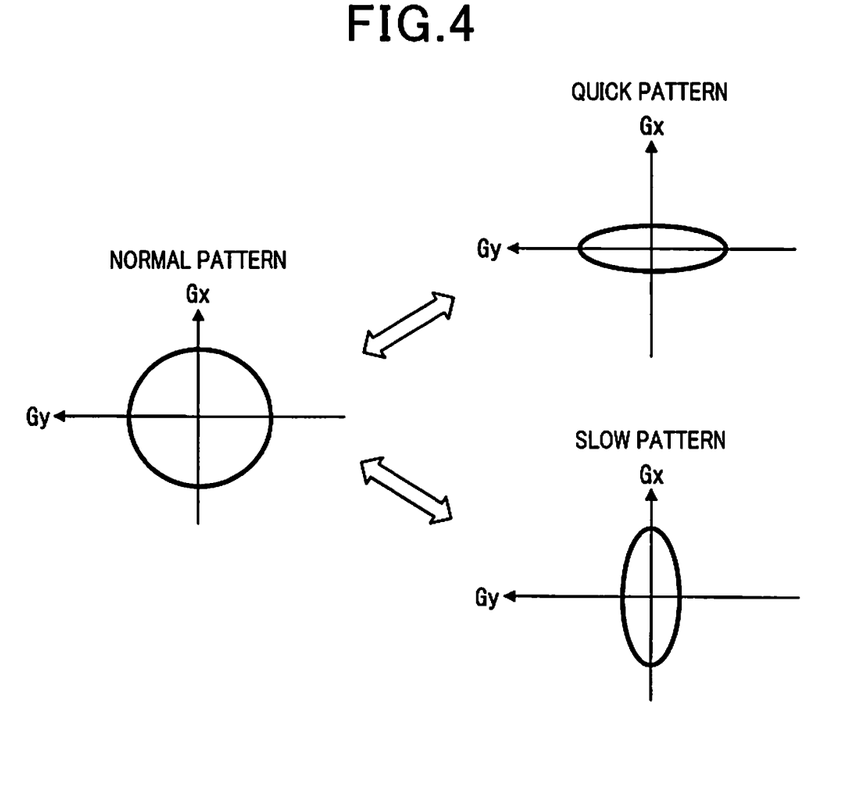
FIG. 4 is a schematic diagram showing an example of a pattern of the G Lissajous figure when numerical values of a gain K(p) are changed.

Next, changing the G Lissajous figure to a circular shape or an arbitrary ellipsoidal shape by changing numerical values of the gain K(P) is explained with reference to FIG. 4. FIG. 4 is a schematic diagram showing an example of a pattern of the G Lissajous figure when numerical values of the gain K(p) are changed. Hereinafter, a case is explained where Gx and Gy meet the expression 3. Note that since the G Lissajous figure represents the relationship between the longitudinal acceleration Gx and the lateral acceleration Gy, the pattern of the G Lissajous figure shows a pattern of behavior of the vehicle.

For example, if the gain $K_1(p)$ is 1, the G Lissajous figure becomes a circular shape. When defining this case as a standard, the behavior of the vehicle in the normal pattern is shown.

If the gain $K_1(p)$ is more than 1, as the gain $K_1(p)$ is larger, the G Lissajous figure becomes an ellipsoidal shape whose radius in the direction of the ordinate axis is smaller. In this case, the behavior of the vehicle in the slow pattern is shown in which the vehicle turns after greatly decelerating.

If the gain $K_1(p)$ is less than 1, as the gain $K_1(p)$ is smaller, the G Lissajous figure becomes an ellipsoidal shape whose radius in the direction of the abscissa axis is smaller. In this case, the behavior of the vehicle in the quick pattern is shown in which the vehicle turns after decelerating slightly.

In the above explanation, in the normal pattern, the G Lissajous figure becomes a circular shape. While the G Lissajous figure in the normal pattern is in a shape between those of the quick pattern and the slow pattern, the G Lissajous figure in the normal pattern may be an ellipsoidal shape whose radius in the direction of the ordinate axis is smaller or an ellipsoidal shape whose radius in the direction of the abscissa axis is smaller.

Next, based on the relationship between Gx and Gy described above, a method of deriving an expression for calculating target acceleration is explained. Hereinafter, the target acceleration, that is, the longitudinal acceleration Gx to be targeted is defined as a longitudinal acceleration Gx_ob. First, Gx_ob is found by the following expression 5 based on the expression 3.

$$Gx\_ob = K_1(p) \dot{G}y \quad \text{(Expression 5)}$$

Gy is expressed by the following expression 6. The following expression 6 can be converted to the following expression 7. Note that p is a curvature of the road, on which the own vehicle is traveling, and v is current own vehicle speed. In addition, using the expression 7 can convert the expression 5 to the following expression 8.

$$Gy = \rho v^2 \quad \text{(Expression 6)}$$

$$\dot{G}y = \dot{\rho} v^2 + 2\rho v \dot{v} \quad \text{(Expression 7)}$$

$$Gx\_ob = \frac{K_1(p) \dot{\rho} v^2}{1 - 2K_1(p) \rho v} \quad \text{(Expression 8)}$$

Using the expression 8 can calculate the target acceleration Gx_ob from the current own vehicle v, the curvature p of the road on which the own vehicle is traveling, and the gain K(p). In the present embodiment, the target acceleration calculation section 66 calculates the target acceleration using the expression 8.

<Speed Control Process>

Figure 5:
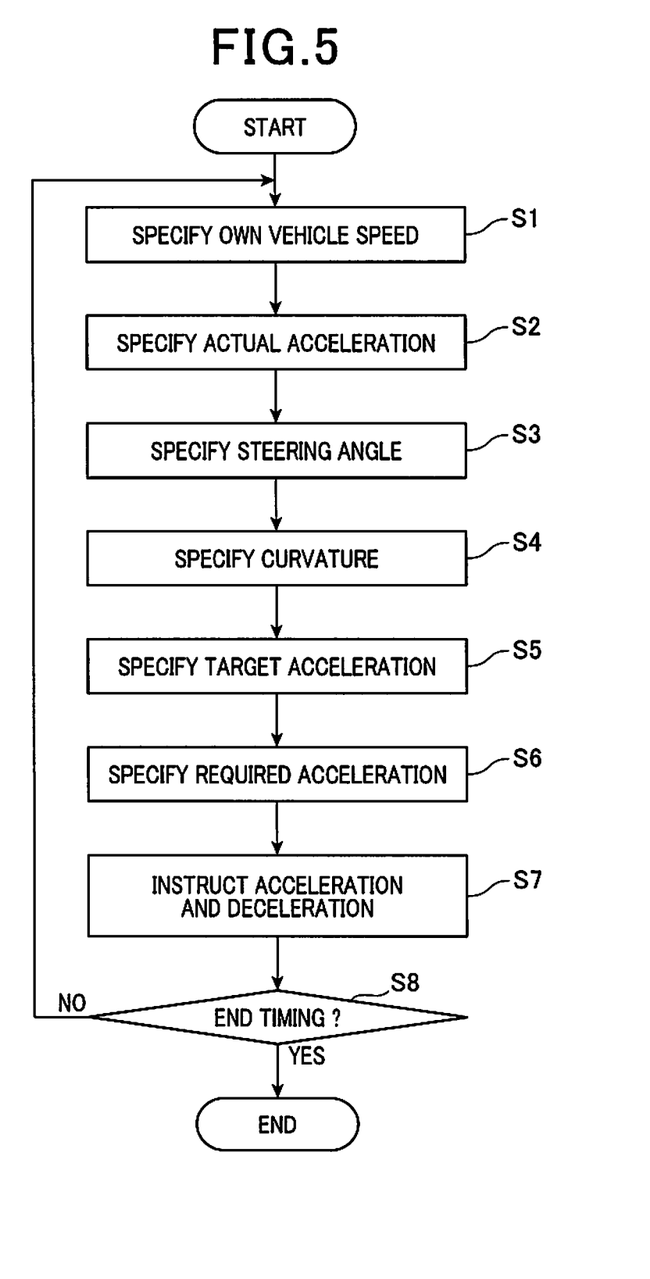
FIG. 5 is a flowchart showing an example of a process concerning speed control of the vehicle control ECU.

Hereinafter, the speed control process performed by the vehicle control ECU 6 is explained with reference to the flowchart shown in FIG. 5. The flowchart may be started when switched to the mode of automatically controlling the own vehicle speed, for example, by operating the automatic speed control change switch of the operation switches 5.

First, in step S1, the vehicle speed specifying section 61 specifies current own vehicle speed. Then, the process proceeds to step S2. In step S2, the actual acceleration specifying section 62 specifies current accrual acceleration of the own vehicle from the current own vehicle speed specified in step S1. Then, the process proceeds to step S3.

In step S3, the steering angle specifying section 63 specifies a current steering angle of the own vehicle. Then, the process proceeds to step S4. In step S4, the curvature specifying section 64 specifies a curvature of the road, on which the own vehicle is traveling, from the current steering angle of the own vehicle specified in step S3. Then, the process proceeds to step S5.

Note that the order of the steps S1 to S2 and the steps S3 to S4 may be changed, or the steps S1 to S2 and the steps S3 to S4 may be performed in parallel.

In step S5, the target acceleration calculation section 66 calculates target acceleration using the expression 8 based on the current own vehicle speed specified in step S1, the curvature of the road, on which the own vehicle is traveling, specified by the curvature specifying section 64, and the value of the gain selected by the gain selection section 65. Then, the process proceeds to step S6.

In step S6, the acceleration and deceleration instruction section 67 subtracts the actual acceleration specified in the step S2 from the target acceleration calculated in the step S5 to calculate the required acceleration required for making the actual acceleration coincide with the target acceleration. Then, the process proceeds to step S7. In step S7, the acceleration and deceleration instruction section 67 instructs the engine ECU 3 and the brake ECU 4 to perform acceleration and deceleration corresponding to the required acceleration calculated in the step S6. Then, the process proceeds to step S8.

In step S8, if the speed control process has reached the end timing (YES in step S8), the speed control process is ended. If the speed control process has not reached the end timing (NO in step S8), the speed control process returns to step S1 and is repeated. The end timing may be the timing when the power supply of the vehicle control ECU 6 is turned off, or the timing when changing from the mode of automatically controlling the own vehicle speed to a normal mode of controlling the own vehicle speed according to operation of the driver.

Summary of First Embodiment

According to the configuration of the first embodiment, the target acceleration calculation section 66 calculates target acceleration (i.e. longitudinal acceleration to be targeted) satisfying the relationship shown in the expression 3 represented by a Lissajous curve of a circle or an ellipse. As described above, since the expression 3 and the expression 4 are substantially the same, the target acceleration satisfying the relationship shown in the expression 3 also satisfies the relationship shown in the expression 4. If the relationships shown in the expressions 3 and 4 are satisfied, traveling stability of the vehicle is estimated to be maintained. Thus, according to the configuration of the first embodiment, speed control can be performed so that the vehicle can turn while keeping the traveling stability.

In addition, the target acceleration calculation section 66 calculates the target acceleration satisfying the relationships shown in the expressions 3 and 4 by the expression 8 based on the curvature of the road, on which the own vehicle is traveling, and the own vehicle speed. Thus, the target acceleration can be calculated by which the vehicle can turn while keeping the traveling stability of the vehicle depending on the curvature of the road, on which the own vehicle is traveling. As a result, the speed control can be performed so that the vehicle can turn along the curvature of the curve in the road while keeping the traveling stability of the vehicle. That is, the speed control can be performed so that the vehicle can smoothly turn along the curvature of the curve in the road.

In addition, when the acceleration and deceleration control is performed so that an actual acceleration coincides with the target acceleration satisfying the relationship shown in the expressions 3 and 4 represented by a Lissajous curve of a circle or an ellipse, the vehicle can smoothly accelerate and decelerate even when the curvature of the road is suddenly changed. Hence, also in this regard, the speed control can be performed so that the vehicle can smoothly turn along the curvature of the curve in the road.

Figure 6A:
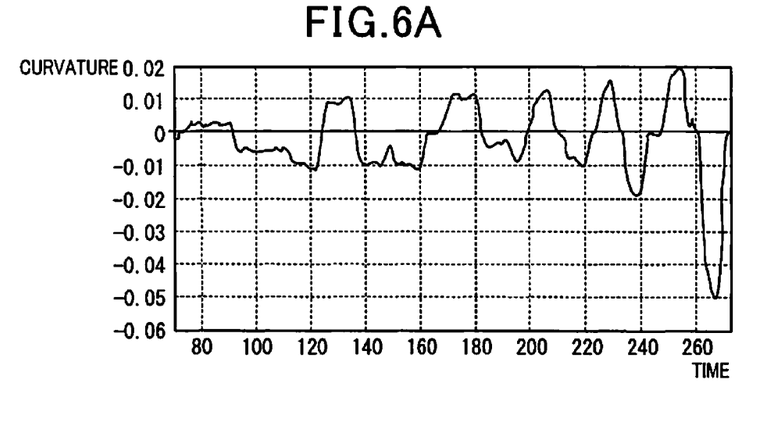
FIGS. 6A and 6B are graphs showing an example of the speed control performed so that the vehicle smoothly turns along a curvature of a curve in a road according to a first embodiment.
Figure 6B:
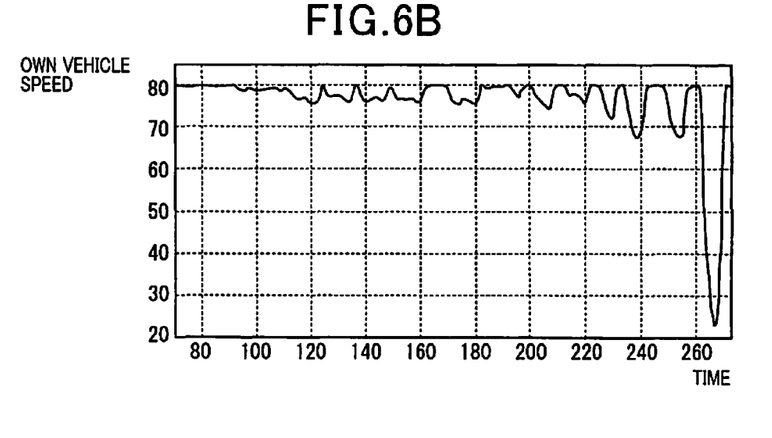

Hereinafter, advantages of the configuration according to the first embodiment are explained with reference to FIGS. 6A and 6B. FIGS. 6A and 6B are graphs showing an example of the speed control performed so that the vehicle smoothly turns along a curvature of a curve in a road according to the first embodiment. FIG. 6 shows an example in which the vehicle travels in the mode of automatically controlling own vehicle speed in a road in which right-hand and left-hand curves alternately continue. FIG. 6A shows time variation of the curvature of the road, on which the own vehicle is traveling. FIG. 6B shows time variation of the own vehicle speed.

As shown in FIG. 6, according to the configuration of the first embodiment, when the vehicle travels in the mode of automatically controlling own vehicle speed in a road in which right-hand and left-hand curves alternately continue, the own vehicle speed can be smoothly changed along the curvature of the curve in the road.

Furthermore, according to the configuration of the first embodiment, changing the value of the gain K(p) can change the pattern of behavior of the vehicle during turning, during which the speed of the vehicle is automatically controlled, while the relationship is satisfied by which the traveling stability of the vehicle is estimated to be maintained. Specifically, the user operates the turning behavior selection switch of the operation switches 5 to select any of the quick pattern, the slow pattern, and the normal pattern. Thus, the pattern of behavior of the vehicle during turning, during which the speed of the vehicle is automatically controlled, can be set to the selected pattern. Accordingly, the speed can be controlled with reflecting preference of the user.

In addition, according to the configuration of the first embodiment, since the gain K(p) is used which is determined by the one-dimensional parameter p, the speed can be controlled with reflecting preference of the user more easily compared with the speed control apparatus disclosed in JP-A-2008-29046 which is required to create a two-dimensional map according to two parameters such as speed and a curvature.

In addition, according to the configuration of the first embodiment, when the curvature of the road, on which the own vehicle is traveling, is 0, that is, when the own vehicle is traveling on a straight road, the expression 8 determines that the target acceleration is 0. Thus, when the own vehicle is traveling on the straight road, the speed is controlled so that the own vehicle is in uniform motion. As described above, according to the configuration of the first embodiment, even when the own vehicle is traveling on a straight road or a curve in a road, the speed of the vehicle can be controlled using the expression 8, without determining whether the own vehicle is traveling on a straight road or a curve in a road.

(First Modification)

In the first embodiment, the gain K(P) is used, which is determined by an one-dimensional parameter p, to calculate target acceleration. However, for example, the gain may be used, which is determined by a two or more-dimensional parameter, to calculate target acceleration. Examples of the parameter include own vehicle speed and a curvature of the road, on which the vehicle is traveling.

(Second Modification)

In the first embodiment, the actual acceleration specifying section 62 specifies actual acceleration of the own vehicle from the own vehicle speed specified by the vehicle speed specifying section 61. However, for example, when the vehicle control ECU 6 can acquire a signal of an acceleration sensor detecting longitudinal acceleration of the own vehicle, the actual acceleration specifying section 62 may specify the actual acceleration from the signal of the acceleration sensor.

(Third Modification)

In the first embodiment, the curvature specifying section 64 specifies a curvature of the road, on which the vehicle is traveling, from the steering angle of the own vehicle specified by the steering angle specifying section 63. However, for example, when the vehicle control ECU 6 can acquire the position of the own vehicle determined by using a satellite positioning system and map data including data of curvatures of road section, the curvature specifying section 64 may specify the curvature from the position of the own vehicle and the map data.

(Fourth Modification)

In the first embodiment, the value of the gain used for calculating target acceleration can be changed based on input operation of the user. However, for example, the value of the gain used for calculating target acceleration may be fixed.

(Fifth Modification)

In the first embodiment, target acceleration is calculated by the expression 8 based on the curvature of the road, on which the vehicle is traveling, and the own vehicle speed. However, for example, when the vehicle control ECU 6 can acquire a signal of an acceleration sensor detecting lateral acceleration of the own vehicle, the target acceleration calculation section 66 may calculate longitudinal acceleration by the expression 5, based on the lateral acceleration of the own vehicle specified by the signal of the acceleration sensor, as the target acceleration.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a driving support apparatus is installed in a vehicle. The apparatus includes: an actual longitudinal acceleration specifying section (62) which specifies actual longitudinal acceleration of the vehicle; a target longitudinal acceleration specifying section (66) which specifies target longitudinal acceleration of the vehicle; and an acceleration and deceleration instruction section (67) which allows acceleration and deceleration control so that the actual longitudinal acceleration specified by the actual longitudinal acceleration specifying section coincides with the target longitudinal acceleration specified by the target longitudinal acceleration specifying section. The target longitudinal acceleration specifying section specifies the target longitudinal acceleration so that traveling stability of the vehicle, which is represented by a Lissajous curve of a circle or an ellipse, is maintained, and a relationship between longitudinal acceleration and lateral acceleration, in which lateral acceleration of the vehicle is advanced or delayed in phase with respect to longitudinal acceleration, is satisfied.

Since the lateral acceleration can be represented by multiplying the square of the vehicle speed by the curvature of the road, the longitudinal acceleration satisfying the relationship between the longitudinal acceleration and the lateral acceleration, which is represented by the Lissajous curve of a circle or an ellipse, is determined depending on the curvature of the road. The driving support apparatus specifies the longitudinal acceleration as the target longitudinal acceleration so that the traveling stability of the vehicle, which is represented by the Lissajous curve of a circle or an ellipse, is maintained, and the relationship between the longitudinal acceleration and the lateral acceleration, in which the lateral acceleration of the vehicle is advanced or delayed in phase with respect to the longitudinal acceleration, is satisfied. Hence, the target longitudinal acceleration is specified which is determined depending on the curvature of the road, and by which the traveling stability of the vehicle is maintained. Then, since acceleration and deceleration are controlled so that the actual longitudinal acceleration coincides with the target longitudinal acceleration, the speed can be controlled so that the vehicle can turn along the curvature of the curve in the road while keeping the traveling stability of the vehicle. That is, the speed control can be performed so that the vehicle can smoothly turn along the curvature of the curve in the road.

In addition, when the acceleration and deceleration control is performed so that the actual longitudinal acceleration coincides with the target longitudinal acceleration specified so as to satisfy the relationship between the longitudinal acceleration and the lateral acceleration represented by the Lissajous curve of a circle or an ellipse, the vehicle can smoothly accelerate and decelerate even when the curvature of the road is suddenly changed. Hence, also in this regard, the speed control can be performed so that the vehicle can smoothly turn along the curvature of the curve in the road.

What is claimed is:

1. A driving support apparatus which is installed in a vehicle, the apparatus comprising:
an actual longitudinal acceleration specifying section which specifies actual longitudinal acceleration of the vehicle;
a target longitudinal acceleration specifying section which specifies target longitudinal acceleration of the vehicle; and
an acceleration and deceleration instruction section which allows acceleration and deceleration control so that the actual longitudinal acceleration specified by the actual longitudinal acceleration specifying section coincides with the target longitudinal acceleration specified by the target longitudinal acceleration specifying section, wherein
the target longitudinal acceleration specifying section specifies the target longitudinal acceleration so that traveling stability of the vehicle, which is represented by a Lissajous curve of a circle or an ellipse, is maintained, and a relationship between longitudinal acceleration and lateral acceleration, in which lateral acceleration of the vehicle is advanced or delayed in phase with respect to longitudinal acceleration, is satisfied.

2. The driving support apparatus according to claim 1, wherein
the target longitudinal acceleration specifying section specifies the target longitudinal acceleration so that the following expression, which includes a gain whose value can be changed, is satisfied as the relationship:

$$\dot{G}y = K_1(p)Gx$$

where
$K_1(p)$ is the gain, $Gx$ is the longitudinal acceleration, and $Gy$ is the lateral acceleration.

3. The driving support apparatus according to claim 2, wherein
the value of the gain includes a plurality of patterns, and
the apparatus further includes a selection section which selects the value of the gain from the plurality of patterns based on an input operation of a user, wherein
the target longitudinal acceleration specifying section specifies the target longitudinal acceleration so that the relation represented by the expression, into which the value of the gain selected by the selection section is substituted, is satisfied.

4. The driving support apparatus according to claim 2, further comprising:

a curvature specifying section which specifies a curvature of a road on which the vehicle is traveling; and a vehicle speed specifying section which specifies speed of the vehicle, wherein the target longitudinal acceleration specifying section specifies the target longitudinal acceleration by using the following expression derived from the curvature specified by the curvature specifying section, the speed of the vehicle specified by the vehicle speed specifying section, and gain:

$$Gx\_ob = \frac{K_1(p)\dot{p}v^2}{1-2K_1(p)\rho v}$$

where $\rho$ is the curvature, v is the speed of the vehicle, and Gx_ob is the target longitudinal acceleration.

5. The driving support apparatus according to claim 3, further comprising:

a curvature specifying section which specifies a curvature of a road on which the vehicle is traveling; and a vehicle speed specifying section which specifies speed of the vehicle, wherein the target longitudinal acceleration specifying section specifies the target longitudinal acceleration by using the following expression derived from the curvature specified by the curvature specifying section, the speed of the vehicle specified by the vehicle speed specifying section, and gain:

$$Gx\_ob = \frac{K_1(p)\dot{p}v^2}{1-2K_1(p)\rho v}$$

where $\rho$ is the curvature, v is the speed of the vehicle, and Gx_ob is the target longitudinal acceleration.

\* \* \* \* \*